United States Patent Office 3,222,791
Patented Dec. 14, 1965

3,222,791
MEASURING AND RECORDING ARRANGEMENTS
Keith Gordon Huntley, Dukeswood, Gerrards Cross, Arthur Tisso Starr, New Barnet, Hertfordshire, and Vincent Arthur Gault, Hounslow, Middlesex, England, assignors, by direct and mesne assignments, to The Rank Organisation Limited, a British company
Filed Feb. 15, 1961, Ser. No. 89,532
Claims priority, application Great Britain, Feb. 17, 1960, 5,667/60
18 Claims. (Cl. 33—174)

The present invention relates to systems for evaluating and recording in permanent or transient form the contour or profile of an object such as a workpiece.

In a copending application Serial No. 70,842 filed November 21, 1960, there is disclosed a system in which the contour variations of an object are translated into a correspondingly varying electrical signal through sensing means in approximately concentric rotational relationship with said contour for the purpose of displaying said contour variations on a greatly magnified scale in the form of a trace upon a chart in such manner that the evaluation of the trace is unaffected by any residual eccentricity in said rotational relationship. In other words, said system is designed automatically to counteract residual eccentricity.

A major object of the present invention is to counteract residual eccentricity by purely electrical means dispensing with the need for accurate mechanical displacement of parts.

Another object is to derive a signal output which extended to electrically responsive display means enables a contour trace to be displayed which is correctly positioned relatively to a datum, such as for example the centre of a disk chart, in a manner unaffected by residual eccentricity.

Another object is to derive a signal output which extended to electrically responsive display means enable a contour trace to be displayed which is correctly positioned relatively to a datum, such as for example the centre of a disk chart, in a manner unaffected by residual eccentricity and in addition enables a mean trace to be correctly superposed upon the contour trace.

A further object is to derive a signal which extended to electrically responsive display means enables a mean trace to be correctly superposed upon a contour trace despite the fact that the latter may be offset from a datum as a result of residual eccentricity.

The invention consists of a system comprising sensing means adapted to be placed in approximately concentric rotational relationship with an object for the purpose of feeling a given contour of said object, gauge means for deriving from the sensing means a gauge signal comprising a contour signal component corresponding to said contour and an eccentricity signal component corresponding to any residual eccentricity in said rotational relationship, means including electrically responsive display means for translating said contour signal component into a visible corresponding contour trace upon a chart in spaced relation with a datum, and signal derivation means for obtaining from the gauge signal a derived signal output which extended to the display means enables the contour trace to be so displayed so as to ensure its correct evaluation despite any residual eccentricity.

The signal derivation means preferably include means for extracting from the gauge signal the sine wave representing the eccentricity signal component.

By backing off said gauge signal with said sine wave an output signal is derived which is free from the eccentricity signal component and contains only the contour signal component. Said output signal fed to the display means enables it to produce a contour trace the positioning of which relatively to the datum is free from the effect of residual eccentricity. The mean of the trace so displayed is governed by the degree of gauge signal magnification.

Two further alternatives are possible. The derived sine wave may be superposed upon a D.C. signal for the purpose of superposing a reference trace upon a contour trace suffering from the effect of eccentricity or for the purpose of displaying a contour trace free from the effect of eccentricity and having a selectable means. In the one case, the contour trace may be read against the reference trace; in the other, it may be read against the chart co-ordinates.

Relating the above three alternatives to a system in which a disk chart co-operating with a pen recorder is used, the result in the first alternative is a contour trace concentric with the centre of the chart (i.e. the datum) and having a mean set by the degree of signal magnification; in the second alternative, it is a contour trace eccentric with the centre of the chart but having superposed thereon a reference trace; in the third alternative, it is a contour trace concentric with the centre of the chart upon a mean which may or may not be actually drawn as a mean trace.

If the D.C. signal is the integral of the contour signal component, the reference trace is in fact the means trace.

The above three alternatives will be presently described in detail although not in the order in which they have been introduced hereinabove.

Although the use of polar co-ordinates presents certain advantages, the system of the present invention is equally suitable for the purpose of counteracting said residual eccentricity where rectangular co-ordinates are preferred.

The invention will now be described by way of example only with reference to the accompanying drawings, wherein.

Figure 1:
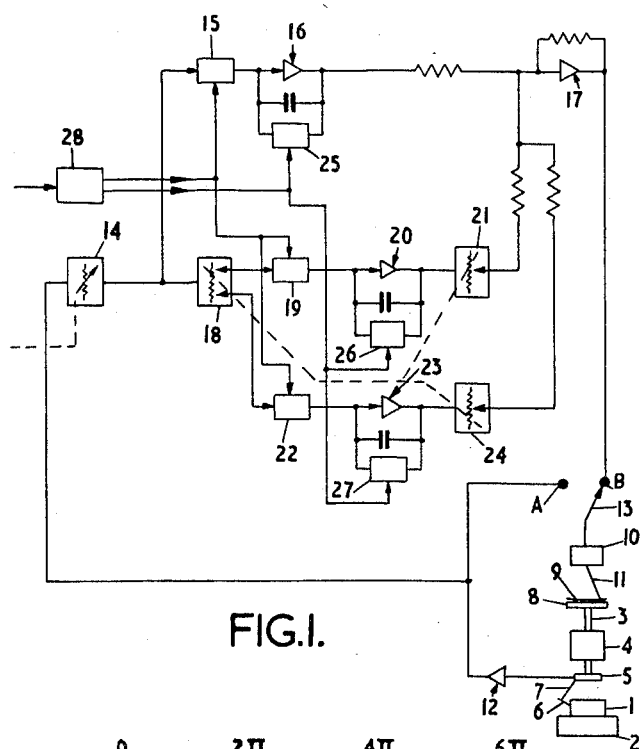
FIG. 1 is a block diagram of a system according to the invention.

In FIG. 1, an object in the form of a cylindrical workpiece the contour of which is to be evaluated and recorded is shown at 1 upon a worktable 2 which is first adjusted, until the contour and the spindle 3 mounted in quill 4 are in approximately concentric rotational relationship, and then locked.

One end of spindle 3 carries gauge means in the form of a transducer 5 for translating into corresponding electrical signal variations the contour variations transmitted to it through a feeler stylus 6 carried by pivotally mounted arm 7, the feeler stylus forming part of the sensing means hereinbefore referred to.

The other end of the spindle carries a chart table 8 upon which is located a disk chart 9 the centre of which is concentric with the axis of the spindle. Display means in the form of a pen recorder 10 is disposed above the chart so that pen 11 is able to swing radially across the chart.

In the above arrangement, rotation of spindle 3 causes transducer 5 to generate a gauge signal consisting of a contour signal component, corresponding to said contour, and an eccentricity signal component, representing any residual eccentricity in the rotational relationship.

The gauge signal is routed through gauge amplifier 12.

If no residual eccentricity were present, the output from amplifier 12 fed directly to recorder 10 would cause the latter to draw, on a magnified scale, the actual contour including any irregularities thereof in the form of a wavy contour trace centred on the centre of the chart. In hitherto known instruments, the elimination of residual eccentricity requires very laborious setting up of the workpiece. This may be readily appreciated when considering that at the higher magnification ranges the tolerance may be in the region of a few micro-inches.

The present invention is concerned in the main with the means for deriving a signal output from the amplified gauge signal which extended to the recorder enables contour traces to be drawn the evaluation of which is unaffected by residual eccentricity within a relatively wide margin. In this manner, the tolerance can be raised to a figure as high as hundreds of micro-inches, which is easily attained by manual setting up of the workpiece.

The diagram of FIG. 1 clearly shows that the recorder 10 may be connected either to amplifier 12, when switch 13 is in position A, or to signal derivation means presently to be described, when the switch is in position B.

The signal derivation means comprise two signal paths downstream of scaling attenuator 14, one extending through relay switch 15, storing integrator 16, summing amplifier 17, and the other extending through sine/cosine potentiometer 18 into one branch comprising relay switch 19, storing integrator 20, cosine potentiometer 21, adding amplifier 17 and into a further branch comprising relay switch 22, storing integrator 23, sine potentiometer 24, adding amplifier 17, the three potentiometers being integral in rotation with the spindle.

In the present context the expression "relay switch" is intended to refer to an on-off device responsive to a controlling input. It includes, for instance, electromagnetic and electronic relays.

Through the first path there is made available at the output of amplifier 17 the integral of the contour signal component, and through the second path, the sine wave representing the eccentricity signal component. This means that the derived output issuing from amplifier 17 is in effect a D.C. value superposed upon a sine wave, representing, respectively, the D.C. component of the contour signal component and the fundamental of the gauge signal, which gauge signal is a function of the angle of relative rotation between workpiece and spindle.

Mathematically it can be shown that the result of feeding the derived output as defined to the recorder is to cause the pen thereof to draw a reference trace which may be shown to be correct to a first order of approximation, the shape actually drawn only approaching a true circle as the eccentricity in the rotational relationship approaches zero. A contour trace having superposed thereon a concentric reference trace may be easily evaluated despite the fact that it may be eccentric to the centre of the chart.

Basically, the derived output conforms to the equation $$f\theta = a_0 + a_1 \cos \theta + b_1 \sin \theta$$

where:

$a_0$ is the D.C. component of the contour signal component.
$a_1$ is the amplitude of the cosine of the eccentricity signal component.
$b_1$ is the amplitude of the sine of the eccentricity signal component.

Operationally, $a_0$ is defined by storing integrator 16, $a_1$ is defined by first multiplying the gauge signal by the cosine through sine/cosine potentiometer 18 and then integrating the result through integrator 20; likewise, for sine $b_1$ is defined through potentiometer 18 and storing integrator 23; multiplication by $\cos \theta$ is provided by cosine potentiometer 21 and that by sine $\theta$ by sine potentiometer 24; summation is given by amplifier 17; the upper limit of integration is set through switches 15, 19, and 22 (already referred to) and the lower limit through re-set relay switches 25, 26, and 27, which in the make condition empty the associated integrators thus resetting them.

The correct sequence of events is given by pulse generator 28 triggered by contact means co-operating with spindle 3.

In operation, with all relay contacts open, with the exception of contacts of relays 25, 26, and 27 which are closed to ensure that integrators are empty at the beginning of a cycle, spindle 3, is caused to rotate by power means not shown. At a predetermined angular position which marks the beginning and end of a complete revolution, spindle 3 causes switch 13 to change over from position B to position A and triggers at the same time pulse generator 28 which causes contacts of relay switches 15, 19, and 22 to close and remain closed for one complete revolution while at the same time it causes contacts of relay switches 25, 26, and 27 to open and remain open for the same revolution.

While the first revolution is in progress and until it is completed, recorder 10 draws the contour trace in response to the gauge signal, integrator 16 integrates and stores the contour signal component, integrator 20 evaluates and stores the cosine amplitude of the eccentricity signal component, integrator 23 evaluates and stores the sine amplitude of the eccentricity signal component.

At the end of one complete revolution, spindle 3 causes switch 13 (incidentally switch 13 may well be a relay switch) to move over to position B and pulse generator 28 to break the contacts of relay switches 15, 19, and 22 while contacts of relay switches 25, 26, and 27 remain open. From the beginning of the second revolution and for its entire duration, the integral stored in integrator 16 is superposed upon the signal issuing from the second path. As a result, a reference trace (in fact a mean trace) is drawn in which the same degree of eccentricity of the previously drawn contour trace relatively to the centre of the chart is repeated with accurate phasing therebetween, i.e. the mean trace is drawn concentric with the contour trace.

It should be observed that scaling attenuator 14 is intended for the purpose of suitably proportioning the integral of the contour signal component so that the contour trace and the reference trace (in particular a mean trace) are in fact drawn with the same degree of magnification.

Before the beginning of a next measuring cycle, the integrators must be emptied. For this purpose, contacts of relay switches 25, 26 and 27 are closed by the pulse generator under the control of the spindle.

In FIG. 1 two distinct lines are shown emerging from the pulse generator. The upper line is for feeding the integrators and the lower line for resetting them.

Figure 2:
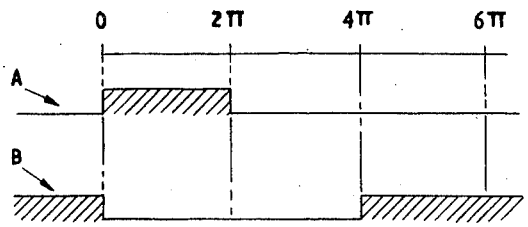
FIG. 2 depicts switch timing associated with the operation of the system of FIG. 1.

The timing in terms of spindle radians of the open and closed conditions of switches 15, 19, and 22 is related to that of switches 25, 26, and 27 in curves A and B respectively of FIG. 2, in which the shaded portions indicate contacts closed. The two curves are not intended to represent actual energisation of the relay switches.

The above embodiment illustrates the realization of the second of the three alternatives hereinbefore referred to.

The third of said alternatives will now be described with reference to FIG. 3.

Figure 3:
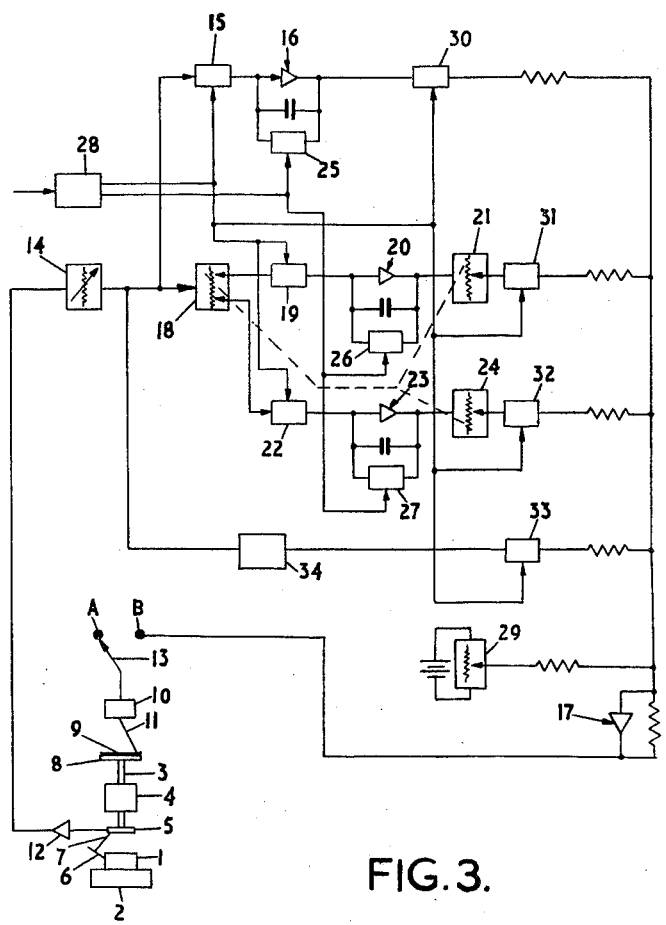
FIG. 3 is a modification of FIG. 1.

FIG. 3 is similar to FIG. 1 with the following exceptions: Position A switch is unconnected. A reference voltage device 29 is added which feeds into the input of summing amplifier 17. Relay switches 30, 31, 32 are interposed to control the output from units 16, 21, and 24, respectively. The gauge signal downstream of attenuator 14 is extended through phase-reversal device 34 and relay switch 33 to the input of amplifier 17.

During the measuring cycles the additional switches are intended to be open when switches 15, 19, and 22 are closed.

At the beginning of a measuring cycle, reference 29 is adjusted to give a voltage which will cause the contour trace to be drawn on the required portion of the chart.

In the first revolution of spindle 3, the operation is identical to that described with reference to FIG. 1., with the exception that switch 13 changes from A to B and the values stored in the integrators are prevented from reaching amplifier 17 because switches 30, 31, and 32 are kept open simultaneously with switches 15, 19, and 22 being triggered and maintained closed. In addition, contacts of relay switch 33 are also open for the first revolution during which the reference device provides the only input to recorder 10. The result is a suitably scaled reference trace concentric with the chart.

At the beginning of the second revolution, switches 15, 19, and 22 are triggered to open and switches 30, 31, 32, and 33 are triggered to close. As a result, and with the co-operation of phase-reversal device 34, the D.C. value stored by integrator 16 backs off the D.C. component of the gauge signal and the sine wave produced by the second path backs off the fundamental component. The derived output fed to recorder 10 is now simply the contour information, which is displayed concentrically superposed upon the reference trace previously drawn.

The first of the three alternatives initially referred to may be simply derived from the layout of FIG. 3 by dispensing with the reference device and the first signal path altogether.

The resulting operation is as follows:

In the first revolution, spindle 3 through pulse generator 28 causes relay switches 19 and 22 to close and 31, 32, and 33 to open. In the second revolution, the spindle trips switch 13 from A to B while causing 31, 32, and 33 to close. The fundamental of the gauge signal is now being backed off and the remaining contour signal component extended to the recorder causes a trace to be produced which is concentric with the centre of the chart upon a mean corresponding to the mean of the contour signal component. This alternative affords notable simplification of equipment although it does not allow a mean reference trace to be actually drawn. Relay switches 26 and 27 naturally remain open from beginning to end of the measuring and recording cycle.

Said third alternative hereinbefore referred to in detail enables a further operation where it is desired to draw the contour trace superposed upon a reference trace which is in fact a mean trace. In this case, the measuring and recording cycle comprises three complete revolutions. Evaluation is effected in the first revolution as before, with the exception that no reference is displayed, the contour trace is displayed in the second revolution, and the mean trace in the third revolution from the integral of the contour signal component evaluated and stored in the first revolution.

Referring to FIGURE 3 of the apparatus, it is useful, first, to consider what would happen if the eccentrically mounted workpiece 1 were perfectly round. If this were the case, then at the end of one revolution, the curve drawn by the recording arm 11 would be a perfect circle, but eccentric with respect to the centre of the chart by an amount proportional to the eccentricity between the axis of rotation of the sensing arm 6 and the centre of the workpiece 1. The circle thus drawn could be represented by the mathematical expression:

$$F(\theta) = a_0 + a_1 \sin \theta + b_1 \cos \theta$$

where $a_0$ is the integral from 0 to $2\pi$ of $f(\theta) \, d\theta$;
$a_1$ is the integral from 0 to $2\pi$ of $f(\theta) \sin \theta \, d\theta$;
$b_1$ is the integral from 0 to $2\pi$ of $f(\theta) \cos \theta \, d\theta$;
$f(\theta)$ is the gauge signal.

At the end of one revolution of the sensing arm 6 the values $a_0$, and $a_1$, and $b_1$ will have been generated and stored as before, and will be available in the relevant circuit elements 16, 20 and 23. By using the stored values $a_0$, $a_1$, and $b_1$ it is possible to generate the terms of the above equation representing the circle. Thus the term $a_1 \sin \theta$ is generated by taking the stored value $a_1$ available in the integrator 20 and multiplying it by the value of $\sin \theta$ as generated in the potentiometer 21, while the term $b_1 \cos \theta$ is similarly generated by taking the stored value $b_1$ in the integrator 23 and multiplying it by the value of $\cos \theta$ obtained from the potentiometer 24.

In order to subtract these two terms from the signal generated by the gauge 5, the two terms $a_1 \sin \theta$ and $b_1 \cos \theta$ are reversed in phase by means of the contacts of the phase reversal device 34 at the output of the attenuator 14. Backing off of these two terms against the gauge signal would result in the constant term $a_0$ alone being generated to draw a perfect circle when acting on the recording instrument 10 by maintaining a steady corresponding deflection. The term $a_0$, however, is proportional to the deflection of the sensing arm 6, and is a constant term of the transducer output. It is important to note that the term $a_0$ is, of course, not proportional to the radius of the workpiece 1, but only to the deflection of the sensing arm at any particular instant.

If the constant signal $a_0$ alone were supplied to the recording instrument 10, the recording arm would, therefore, describe a signal on the chart 9 at some arbitrary radius from the centre of the chart 9, depending on initial adjustment of the gauge means. It is, however, desirable to be able to draw the circle at will at a predetermined radius about the centre of the chart, and this is achieved by also subtracting the term $a_0$ from the gauge signal and to substitute instead an arbitrary constant signal $a_r$, that is to say, a D.C. signal so proportioned as to give the recording arm 11 a suitable deflection for drawing the circle in the desired predetermined position on the chart 9. This is done by using the value $a_0$ made available in the integrator 16 to back-off against the gauge signal, and to add in its place an arbitrary value $a_r$ drawn from the constant current supply source 29. A signal of a predetermined radius will, therefore, be drawn on the chart.

Taking the case now where the workpiece 1 is not a perfect circle, but is a nominally circular workpiece, the surface profile of which is to be inspected, the gauge signal is a pure circle as before, but with higher harmonics added. These higher harmonics are not removed by the backing-off process just described which removes that portion of the gauge signal due to eccentric mounting of the workpiece, but they are still left, and are drawn concentrically with respect to the centre of the chart.

The present invention compared with the disclosure of copending application 70,842 offers the advantage of obviating the need for mechanical displacement in so far as residual eccentricity is taken care of by purely electrical means.

What is claimed is:

1. A system comprising sensing means adapted to be placed in approximately concentric rotational relationship with an object for the purpose of feeling a given contour of said object, gauge means for deriving a gauge signal comprising a contour signal component corresponding to said contour and an eccentricity signal component corresponding to any residual eccentricity in said rotational relationship, means including electrically responsive display means for translating said contour signal component into a visible corresponding contour trace upon a chart in spaced relation with a chart datum, signal derivation means including sine wave extracting means for deriving from the gauge signal the sine wave representing the eccentricity signal component and means applying to said display means said sine wave as a reference trace superimposed upon said contour trace.

2. A system as claimed in claim 1, and which further includes means for backing off said gauge signal with said sine wave, whereby a derived output is obtained which is free from the eccentricity signal component and enables said display means to display a contour trace correctly positioned relatively to said chart datum.

3. A system comprising sensing means adapted to be placed in approximately concentric rotational relationship with an object for the purpose of feeling a given contour of said object, gauge means for deriving a gauge signal comprising a contour signal component corresponding to said contour and an eccentricity signal component corresponding to any residual eccentricity in said rotational relationship, means including electrically responsive display means for translating said contour signal component into a visible corresponding contour trace upon a chart in spaced relation with a chart datum, signal derivation means including sine wave extracting means for deriving from the gauge signal the sine wave representing the eccentricity signal component, and further including D.C. extracting means for deriving from the gauge signal the integral of the contour signal component means applying said integral of said contour signal component and a signal representative of said sine wave to said display means, and an adjustable D.C. reference potential.

4. A system as claimed in claim 3, and which further includes means for backing off the D.C. component of said contour signal component with said integral, whereby to obtain a derived output which contains contour information only displayable upon a reference trace governed by the value to which said D.C. reference potential has been adjusted.

5. A system as claimed in claim 4, wherein said reference trace is a mean trace.

6. A system as claimed in claim 3, wherein said sine wave extracting means comprise first means for evaluating and storing during a complete revolution of said rotational relationship the amplitude of the cosine of the eccentricity signal component and the amplitude of the sine of the eccentricity signal component and second means for multiplying the cosine amplitude and the sine amplitude respectively by the cosine and the sine of the angle of rotation in another complete revolution, and said D.C. extracting means comprise a first storing integrator.

7. A system as claimed in claim 6, wherein said first means comprise a sine/cosine potentiometer and a second storing integrator and a third storing integrator and said second means a cosine potentiometer and a sine potentiometer, all the potentiometers being integral in rotation with the rotating part in said rotational relationship.

8. A system comprising sensing means adapted to be placed in approximately concentric rotational relationship with an object for the purpose of feeling a given contour of said object, gauge means for deriving a gauge signal comprising a contour signal component corresponding to said contour and an eccentricity signal component corresponding to any residual eccentricity in said rotational relationship, means including electrically responsive display means for translating said contour signal component into a visible corresponding contour trace upon a chart in spaced relation with a chart datum, signal derivation means including sine wave extracting means for deriving from the gauge signal the sine wave representing the eccentricity signal component and D.C. extracting means for deriving from the gauge signal the integral of the contour signal component and means applying said signal derivation means to said display means.

9. A system as claimed in claim 8, wherein said sine wave extraction means comprise first means for evaluating and storing during a complete revolution of said rotational relationship the amplitude of the cosine of the eccentricity signal component and the amplitude of the sine of the eccentricity signal component and second means for multiplying the cosine amplitude and the sine amplitude respectively by the cosine and the sine of the angle of rotation in another complete revolution, and said D.C. extracting means comprise a first storing integrator.

10. A system as claimed in claim 9, wherein said first means comprise a sine/cosine potentiometer and a second storing integrator and a third storing integrator and said second means a cosine potentiometer and a sine potentiometer, all the potentiometers being integral in rotation with the rotating part in said rotational relationship.

11. A sysem as claimed in claim 8 and which further includes means for superimposing said sine wave and said integral so as to produce a derived output enabling said display means to produce a mean trace correctly positioned relatively to a contour trace despite the fact that said contour trace may be offset from said chart datum as a result of residual eccentricity.

12. A system for determining the contour of an object, such as a workpiece, comprising gauge means for producing a gauge signal, in accordance with the contour of said object, means including electrically responsive display means for translating said gauge signal into a visible corresponding contour trace on said display means in spaced relation to a datum on said display means, and signal derivation means for deriving from said gauge signal a signal for recording a reference trace on said display means.

13. A method of displaying a contour trace representing the contour of an object on electrically responsive display means comprising the steps of disposing said object in approximately concentric rotational relationship with sensing means associated with gauge means producing a gauge signal comprising a contour signal component and an eccentricity signal component, amplifying said gauge signal, deriving the residual eccentricity information from said gauge signal in a first complete revolution, backing off the gauge signal with a sine wave representing the eccentricity signal component of said gauge signal in a second complete revolution while feeding the signal thus derived to the display means, whereby a contour trace correctly positioned relatively to a chart datum may be drawn despite any residual eccentricity, said contour trace having a mean governed by the degree of gauge signal magnification and further backing off said gauge signal during said second complete revolution with the integral of the contour signal component evaluated during said first complete revolution and substituting an arbitrary D.C. level, whereby a contour trace may be displayed which has an arbitrary mean.

14. A method as claimed in claim 13, wherein the display means actually display said arbitrary mean in the form of a reference trace in the first revolution and the contour trace in a second revolution.

15. A method as claimed in claim 14, whereby a mean trace representing the mean of said contour trace is displayed from said integral in a third complete revolution.

16. A method of displaying a contour trace representing the contour of an object on electrically responsive display means comprising the steps of disposing said object in approximately concentric rotational relationship with sensing means associated with gauge means producing a gauge signal comprising a contour signal component and an eccentricity signal component, amplifying said gauge signal, displaying the contour trace in one complete revolution while deriving the eccentricity information and the integral of said contour signal component, superposing said integral and a sine wave representing said eccentricity signal component, and feeding the signal thus derived to the display means in a second complete revolution whereby a mean trace may be superposed in correct spaced relation upon a contour trace despite any offsetting of said contour trace relatively to a datum as a result of residual eccentricity.

17. In the method for determining the contour of an object by means of a sensing member brought into approximately concentric rotational relation to said object and wherein said sensing member produces an electrical signal in accordance with the contour of said object and which signal still contains errors originating from any residual eccentricity of the rotational relationship, the improvement which includes the steps of using the signal generated by said sensing member directly for recording a contour trace, and deriving from said generated signal a signal for recording an average reference trace in concentric relation to said contour trace.

18. A method as claimed in claim 17 and which includes the further step of adding to said signal generated by said sensing member a correction signal derived therefrom which compensates for the eccentricity effect contained in said generated signal.

References Cited by the Examiner

UNITED STATES PATENTS

| | | | |
|---|---|---|---|
| 2,723,461 | 11/1955 | Reason et al. | 33—174 |
| 3,160,958 | 12/1964 | Huntley | 33—174 |

FOREIGN PATENTS

| | | |
|---|---|---|
| 1,230,164 | 3/1960 | France. |

ISAAC LISANN, *Primary Examiner.*